(12) United States Patent
Gold et al.

(10) Patent No.: US 10,232,439 B2
(45) Date of Patent: Mar. 19, 2019

(54) GAS FLOW MONITORING IN ADDITIVE MANUFACTURING

(71) Applicant: General Electric Company, Schenectady, NY (US)

(72) Inventors: Scott Alan Gold, Waynesville, OH (US); James Harding Shealy, Dayton, OH (US); Jonathan William Ortner, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/947,837

(22) Filed: Nov. 20, 2015

(65) Prior Publication Data

US 2017/0144223 A1 May 25, 2017

(51) Int. Cl.
| | |
|---|---|
| *B22F 3/105* | (2006.01) |
| *B23K 26/342* | (2014.01) |
| *B23K 26/12* | (2014.01) |
| *B28B 1/00* | (2006.01) |
| *B28B 17/00* | (2006.01) |
| *B33Y 50/02* | (2015.01) |
| *B29C 64/153* | (2017.01) |
| *B33Y 10/00* | (2015.01) |

(52) U.S. Cl.
CPC .......... *B22F 3/1055* (2013.01); *B23K 26/123* (2013.01); *B23K 26/342* (2015.10); *B28B 1/001* (2013.01); *B28B 17/0081* (2013.01); *B29C 64/153* (2017.08); *B33Y 50/02* (2014.12); *B22F 2003/1056* (2013.01); *B22F 2003/1057* (2013.01); *B22F 2999/00* (2013.01); *B33Y 10/00* (2014.12); *Y02P 10/295* (2015.11)

(58) Field of Classification Search
CPC .................................................. B22F 3/1055
See application file for complete search history.

(56) References Cited

U.S. PATENT DOCUMENTS

| 4,144,766 A | 3/1979 | Wehrmeister |
| 4,419,562 A | 12/1983 | Jon et al. |
| 5,427,733 A | 6/1995 | Benda et al. |
| 6,925,346 B1 | 8/2005 | Mazumder et al. |
| 8,303,886 B2 | 11/2012 | Philippi |
| 9,056,368 B2 | 6/2015 | Stork Gennannt Wersborg |
| 2009/0206065 A1 | 8/2009 | Kruth et al. |
| 2014/0060188 A1 | 3/2014 | Singh et al. |
| 2014/0301883 A1* | 10/2014 | Wiesner ................ B22F 3/1055 419/1 |
| 2016/0045981 A1* | 2/2016 | Zurecki .............. B23K 26/0006 219/76.12 |

FOREIGN PATENT DOCUMENTS

| AU | 623417 | 5/1995 | |
| CN | 201446232 U | 5/2010 | |
| EP | 2 942 132 A1 | 11/2015 | |
| WO | WO 9208592 A1 * | 5/1992 | ............ B22F 3/1055 |

OTHER PUBLICATIONS

Tan Hua et al.,Research on molten pool temperature in the process of laser rapid forming, Journal of Materials Processing Technology 198 ( 2008 ) 454-462.*

Kamran Shah, et al.,Effects of Melt Pool Variables and Process Parameters in Laser Direct Metal Deposition of Aerospace Alloys, Materials and Manufacturing Processes, 25: 1372-1380, 2010.*

Extended European Search Report issued in connection with corresponding EP Application No. 16199484.3 dated Mar. 27, 2017.

Ferrar, B. et al."Gas flow effects on selective laser melting (SLM) manufacturing performance," In Journal of Materials Processing Technology, vol. 212, Issue No. 2, pp. 355-264 (Feb. 2012)(Abstract).

Machine Translation and First Office Action and Search issued in connection with corresponding CN Application No. 201611016114.0 dated Jun. 4, 2018.

Office Action issued in connection with corresponding EP Application No. 16199484.3 dated Jun. 13, 2018.

* cited by examiner

*Primary Examiner* — Christopher S Kessler

(74) *Attorney, Agent, or Firm* — General Electric Company; Brian Overbeck

(57) ABSTRACT

A method of controlling an additive manufacturing process in which a directed energy source is used to selectively fuse powdered material to form a workpiece, in the presence of a gas flow, the method including: using at least one gas flow sensor to generate at least one gas flow measurement; and controlling at least one aspect of the additive manufacturing process in response to the at least one gas flow measurement.

23 Claims, 3 Drawing Sheets

GAS FLOW MONITORING IN ADDITIVE MANUFACTURING

BACKGROUND OF THE INVENTION

This invention relates generally to additive manufacturing, and more particularly to apparatus and methods for gas flow monitoring and process control in additive manufacturing.

Additive manufacturing is a process in which material is built up layer-by-layer to form a component. Additive manufacturing is limited primarily by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing". Such terms are treated as synonyms for purposes of the present invention.

One type of additive manufacturing machine is referred to as a "powder bed" machine and includes a build chamber that encloses a mass of powder which is selectively fused by a laser to form a workpiece. The build chamber is enclosed in a housing that typically includes provisions for a flow of shielding gas therein. The shielding gas is used to transfer heat away from the surface of the power bed, to prevent vaporized powder from condensing on the surface of the workpiece, and to control undesired chemical reaction such as oxidation.

One problem with prior art additive manufacturing machines is that the gas flow rate can be too high or too low. If the gas flow velocity is too high, it can disturb the powder in the build chamber, disrupting the build process. If the gas flow velocity is too low, it will provide insufficient heat transfer and vapor removal, resulting in measurably worse surface roughness in the finished workpiece.

Another problem with prior art additive manufacturing machines is that the gas flow velocity varies over the surface of the build chamber. Specifically, the gas flow decelerates as it passes over the surface, because of normal pressure and friction losses. The velocity may also be inconsistent in a direction perpendicular to flow. Because of this variation, the gas flow rate may be acceptable in one location but too high or low in another.

BRIEF DESCRIPTION OF THE INVENTION

At least one of these problems is addressed by a method of monitoring gas flow in an additive manufacturing processes and controlling the process in response thereto.

According to one aspect of the technology described herein, a method is provided for controlling an additive manufacturing process in which a directed energy source is used to selectively fuse powdered material to form a workpiece, in the presence of a gas flow. The method includes: using at least one gas flow sensor to generate at least one gas flow measurement; and controlling at least one aspect of the additive manufacturing process in response to the at least one gas flow measurement.

According to another aspect of the technology described herein, a method is provided for making a workpiece, including: depositing a powdered material in a build chamber disposed in a housing, while using a gas flow apparatus coupled in fluid communication with the housing to provide a gas flow over the powder; in the presence of the gas flow, directing a build beam from a directed energy source to selectively fuse the powdered material in a pattern corresponding to a cross-sectional layer of the workpiece; using at least one gas flow sensor to generate at least one measurement of the gas flow; and controlling at least one aspect of making the workpiece in response to the at least one gas flow measurement.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
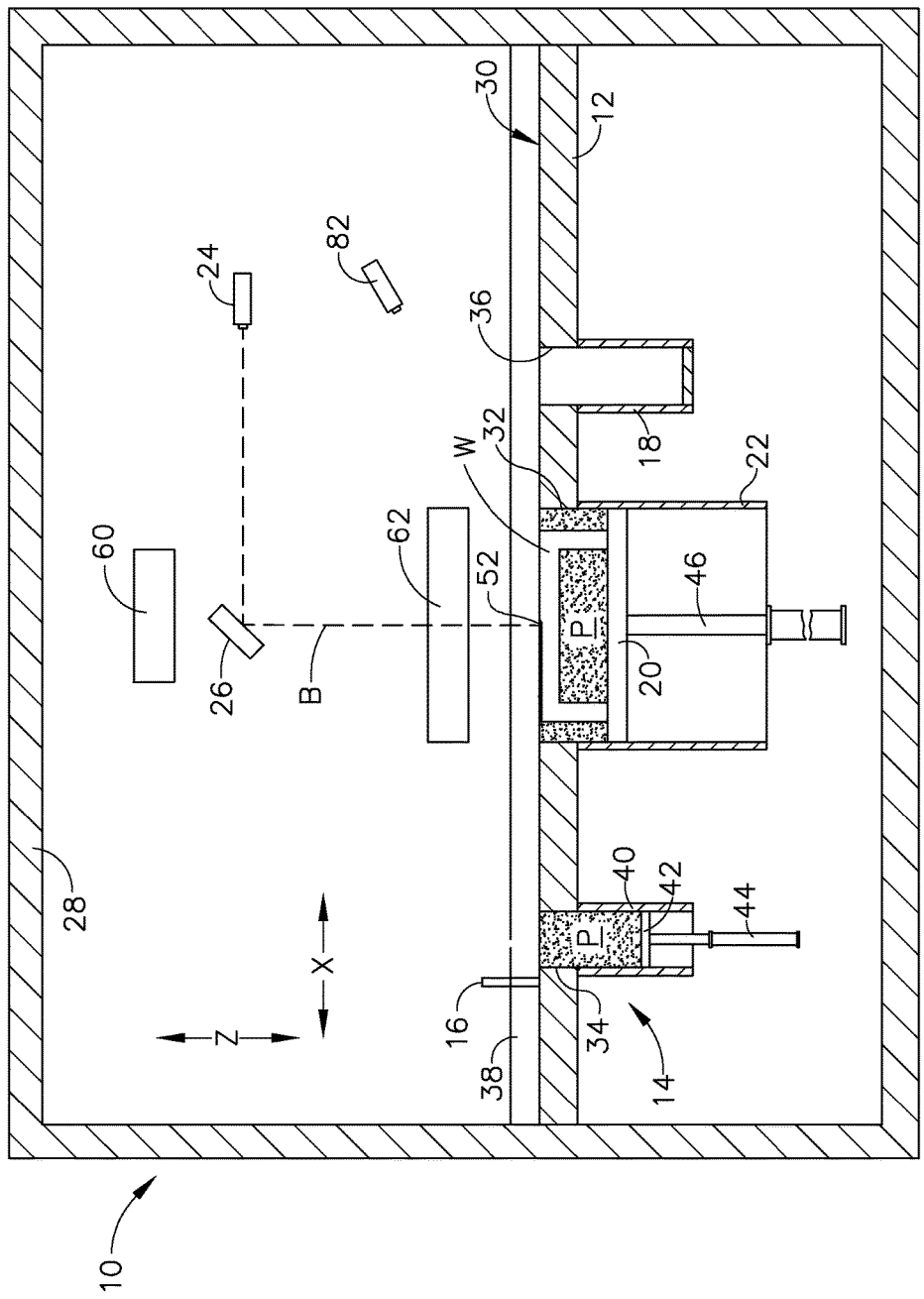
FIG. 1 is a schematic, partially-sectioned front elevation view of an exemplary additive manufacturing machine.

Referring to the drawings wherein identical reference numerals denote the same elements throughout the various views, FIG. 1 illustrates schematically an additive manufacturing machine 10 suitable for carrying out an additive manufacturing method. Basic components of the machine 10 include a table 12, a powder supply 14, a recoater 16, an overflow container 18, a build platform 20 surrounded by a build chamber 22, a directed energy source 24, and a beam steering apparatus 26, all surrounded by a housing 28. Each of these components will be described in more detail below.

The table 12 is a rigid structure defining a planar worksurface 30. The worksurface 30 is coplanar with and defines a virtual workplane. In the illustrated example it includes a build opening 32 communicating with the build chamber 22 and exposing the build platform 20, a supply opening 34 communicating with the powder supply 14, and an overflow opening 36 communicating with the overflow container 18.

The recoater 16 is a rigid, laterally-elongated structure that lies on the worksurface 30. It is connected to an actuator 38 operable to selectively move the recoater 16 along the worksurface 30. The actuator 38 is depicted schematically in FIG. 1, with the understanding devices such as pneumatic or hydraulic cylinders, ballscrew or linear electric actuators, and so forth, may be used for this purpose.

The powder supply 14 comprises a supply container 40 underlying and communicating with the supply opening 34, and an elevator 42. The elevator 42 is a plate-like structure that is vertically slidable within the supply container 40. It is connected to an actuator 44 operable to selectively move the elevator 42 up or down. The actuator 44 is depicted schematically in FIG. 1, with the understanding that devices such as pneumatic or hydraulic cylinders, ballscrew or linear electric actuators, and so forth, may be used for this purpose. When the elevator 42 is lowered, a supply of powder "P" of a desired composition (for example, metallic, ceramic, and/or organic powder) may be loaded into the supply container 40. When the elevator 42 is raised, it exposes the powder P above the worksurface 30. Other types of powder supplies may be used; for example powder may be dropped into the build chamber 22 by an overhead device (not shown).

The build platform 20 is a plate-like structure that is vertically slidable below the build opening 32. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose. When the build platform 20 is lowered into the build chamber 22 during a build process, the build chamber 22 and the build platform 20 collectively surround and support a mass of powder P along with any components being built. This mass of powder is generally referred to as a "powder bed", and this specific category of additive manufacturing process may be referred to as a "powder bed process".

The overflow container 18 underlies and communicates with the overflow opening 36, and serves as a repository for excess powder P.

The directed energy source 24 may comprise any device operable to generate a beam of suitable power and other operating characteristics to melt and fuse the powder P during the build process, described in more detail below. For example, the directed energy source 24 may be a laser. Other directed-energy sources such as electron beam guns are suitable alternatives to a laser.

The beam steering apparatus 26 may include one or more mirrors, prisms, and/or lenses and provided with suitable actuators, and arranged so that a beam "B" from the directed energy source 24 can be focused to a desired spot size and steered to a desired position in plane coincident with the worksurface 30. For purposes of convenient description, this plane may be referred to as a X-Y plane, and a direction perpendicular to the X-Y plane is denoted as a Z-direction (X, Y, and Z being three mutually perpendicular directions). The beam B may be referred to herein as a "build beam".

An exemplary basic build process for a workpiece W using the apparatus described above is as follows. The build platform 20 is moved to an initial high position. The build platform 20 is lowered below the worksurface 30 by a selected layer increment. The layer increment affects the speed of the additive manufacturing process and the resolution of the workpiece W. As an example, the layer increment may be about 10 to 50 micrometers (0.0003 to 0.002 in.). Powder "P" is then deposited over the build platform 20 for example, the elevator 42 of the supply container 40 may be raised to push powder through the supply opening 34, exposing it above the worksurface 30. The recoater 16 is moved across the worksurface to spread the raised powder P horizontally over the build platform 20. Any excess powder P drops through the overflow opening 36 into the overflow container 18 as the recoater 16 passes from left to right. Subsequently, the recoater 16 may be moved back to a starting position. The leveled powder P may be referred to as a "build layer" and the exposed upper surface thereof may be referred to as a "build surface".

Figure 2:
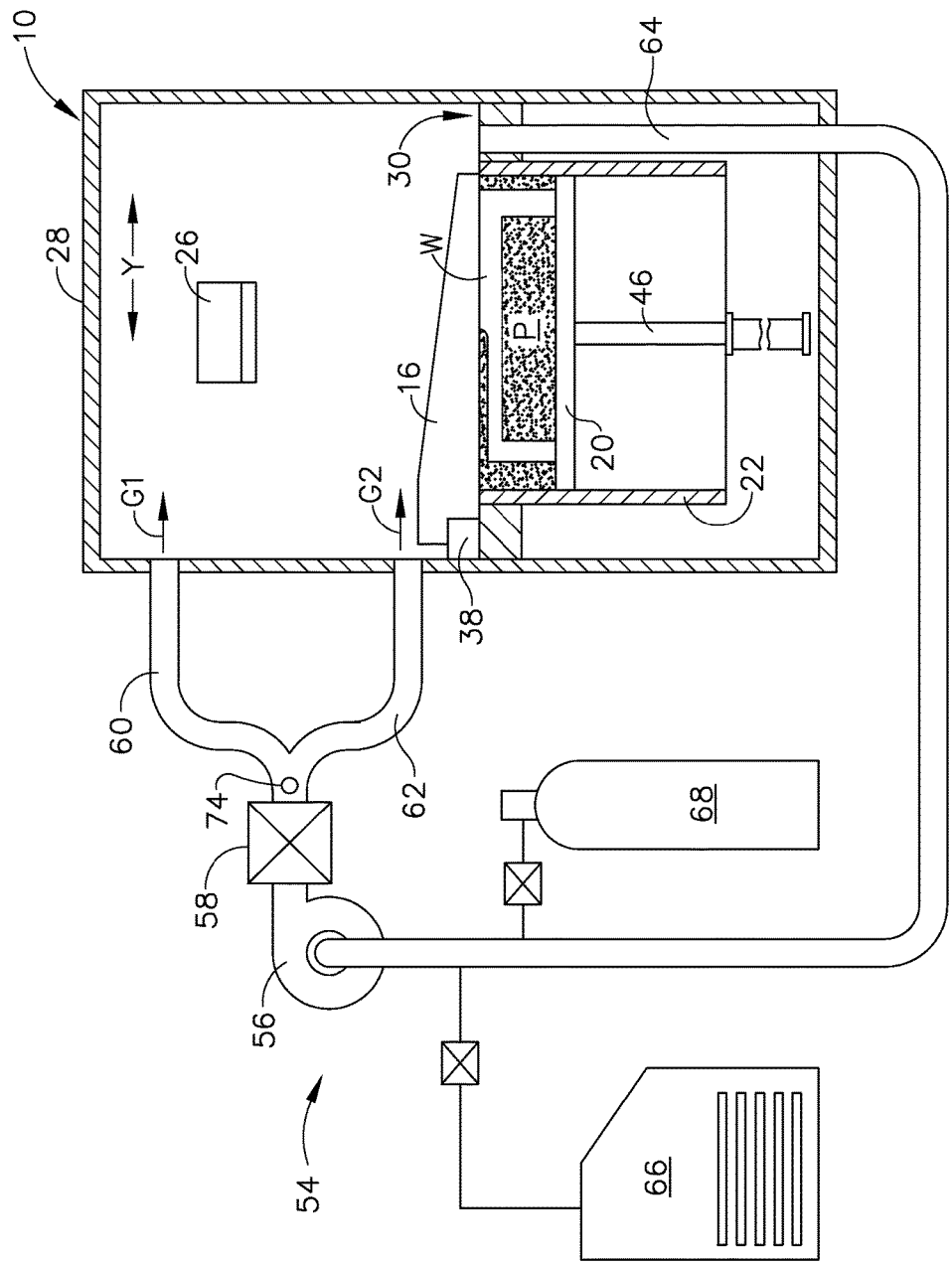
FIG. 2 is a schematic, partially-sectioned side elevation view of the machine of FIG. 1.

The directed energy source 24 is used to melt a two-dimensional cross-section or layer of the workpiece W being built. The directed energy source 24 emits a beam "B" and the beam steering apparatus 26 is used to steer a focal spot of the build beam B over the exposed powder surface in an appropriate pattern. A small portion of exposed layer of the powder P surrounding the focal spot, referred to herein as a "weld pool" 52 (best seen in FIG. 2) is heated by the build beam B to a temperature allowing it to sinter or melt, flow, and consolidate. As an example, the weld pool 52 may be on the order of 100 micrometers (0.004 in.) wide. This step may be referred to as fusing the powder P.

The build platform 20 is moved vertically downward by the layer increment, and another layer of powder P is applied in a similar thickness. The directed energy source 24 again emits a build beam B and the beam steering apparatus 26 is used to steer the focal spot of the build beam B over the exposed powder surface in an appropriate pattern. The exposed layer of the powder P is heated by the build beam B to a temperature allowing it to sinter or melt, flow, and consolidate both within the top layer and with the lower, previously-solidified layer.

This cycle of moving the build platform 20, applying powder P, and then directed energy fusing the powder P is repeated until the entire workpiece W is complete.

The machine 10 and its operation are as representative example of a "powder bed machine". It will be understood that the principles described here are applicable to other configurations of powder bed machines.

The housing 28 serves to isolate and protect the other components of the machine 10. During the build process described above, the housing 28 is provided with a flow of an appropriate shielding gas which, among other functions, excludes oxygen from the build environment. To provide this flow the machine 10 may be coupled to a gas flow apparatus 54, seen in FIG. 2. The exemplary gas flow apparatus 54 includes, in serial fluid flow communication, a variable-speed fan 56, a filter 58, upper and lower inlet ducts 60 and 62 respectively, communicating with the housing 28, and a return duct 64 communicating with the housing 28. All of the components of the gas flow apparatus 54 are interconnected with suitable ducting and define a gas flow circuit in combination with the housing 28.

The composition of the gas used may similar to that used as shielding gas for conventional welding operations. For example, gases such as nitrogen, argon, or mixtures thereof may be used. Any convenient source of gas may be used. For example, if the gas is nitrogen, a conventional nitrogen generator 66 may be connected to the gas flow apparatus 54. Alternatively, the gas could be supplied using one or more pressurized cylinders 68.

Once the gas flow apparatus 54 and machine 10 are initially purged with gas, the fan 56 is used to recirculate the gas through the gas flow circuit in a substantially closed loop, so as to maintain the positive pressure described above, with additional added makeup gas added as needed. Increasing the fan speed increases the velocity and flow rate of gas in the gas flow circuit; conversely, decreasing the fan speed decreases the velocity and flow rate of gas in the gas flow circuit. As an alternative to recirculation, the gas flow apparatus 54 could operate in a total loss mode; for example instead of the gas flowing through the return duct 64 and back to the fan 56, it could simply be vented to atmosphere after passing over the build chamber 22. In the illustrated example, the thermal mass of the gas provides a heat transfer function, however an optional heat exchanger (not shown) could be incorporated into the gas flow apparatus 54.

The upper inlet duct 60 is positioned near the top of the housing 28. During operation it provides a first stream or flow of gas (see arrow "G1") to keep particulates away from the beam steering apparatus 26 and other optical components of the machine 10.

Figure 3:
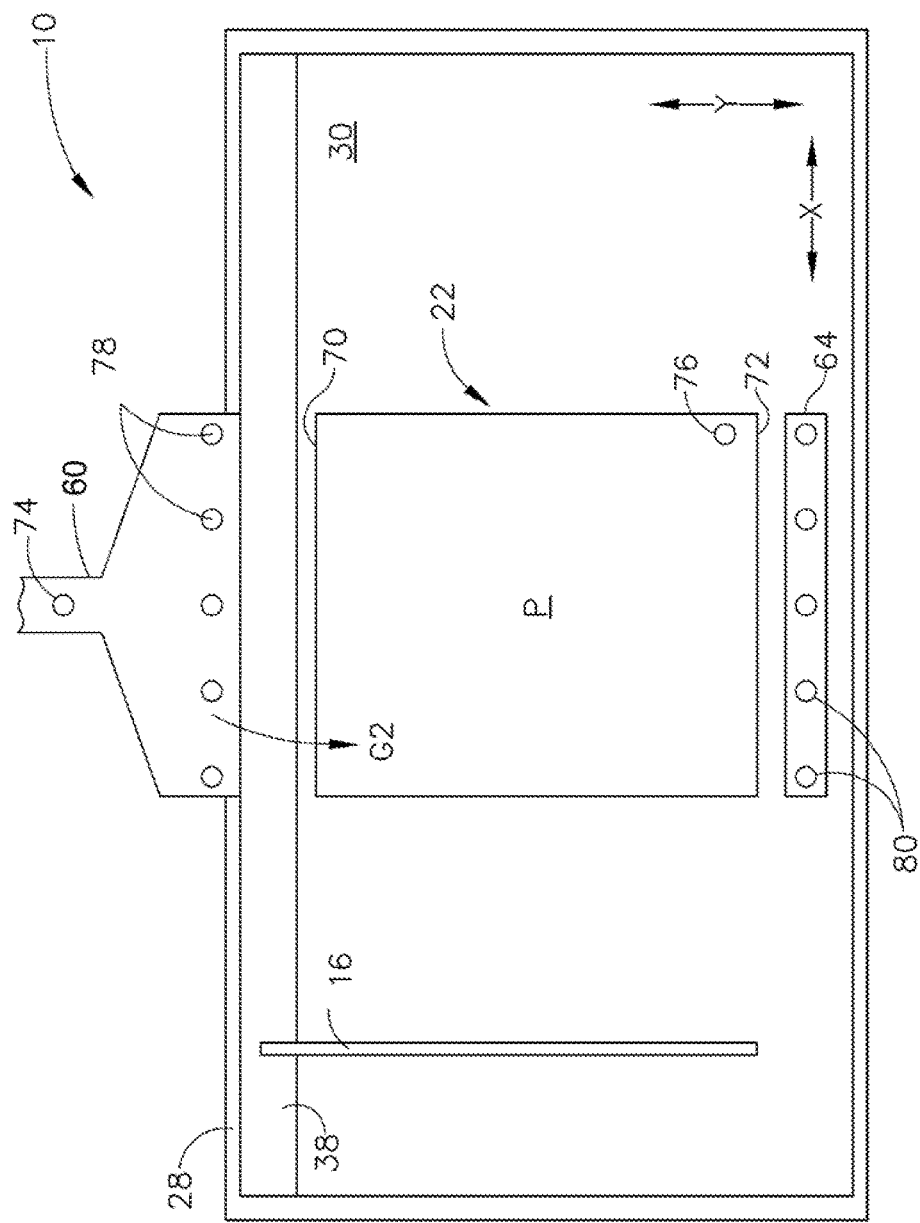
FIG. 3 is a schematic, partially-sectioned top plan view of the machine of FIG. 1.

The lower inlet duct 62 is positioned near the bottom of the housing 28. During operation it provides a section stream or flow of gas (see arrow "G2"). As seen in FIG. 1, the lower inlet duct 62 has an elongated shape (for example rectangular) and discharges gas across the width of the build chamber 22. For reference purposes the width of the build chamber 22 may be considered parallel to the "X" direction. As shown in FIG. 3, the edge of the build chamber 22 closest to the upper inlet duct 60 is referred to as a "leading edge" 70, and the opposite parallel edge is referred to as a "trailing edge" 72. For reference purposes the length of the build chamber (i.e. distance from leading edge 70 to trailing edge 72) may be considered parallel to the "Y" direction.

The second gas flow G2 has two functions. First, it is used to effect heat transfer and carry heat away from the surface of the uppermost built layer within the build chamber 22. Second, during the build process, some of the powder P is vaporized. This vapor can cool and condense on the surface of the workpiece W, in turn causing an undesirable surface roughness or "recast" layer. Part of the second gas flow G2 is used to carry away the vapors and/or condensate.

It has been demonstrated that the gas flow velocity varies over the surface of the build chamber 22. Specifically, the gas flow decelerates as it passes over the surface parallel to the Y direction, because of normal pressure and friction losses. It may also be inconsistent in the X direction. Also, over time, the filter 58 can become clogged with debris, lowering the gas flow rate from its intended value.

Improper or inconsistent gas flow is undesirable. If the gas flow velocity is too high, it can disturb the powder in the build chamber 22. If the gas flow velocity is too low, it will provide insufficient heat transfer and vapor removal, resulting in measurably worse surface roughness.

The machine 10 is provided with at least one gas flow sensor. Any type of sensor operable to generate a signal indicative of a gas flow measurement may be used. As used herein "gas flow measurement" refers to any measurement that quantifies gas flow. Examples of gas flow measurements include but are not limited to velocity, dynamic pressure, volume flow rate, or mass flow rate. Nonlimiting examples of gas flow sensors include mechanical or solid-state anemometers (for example a hot-wire anemometer, sonic anemometer, or laser Doppler anemometer), pitot tubes or other differential pressure-based devices, or combinations of sensors operable to quantify flow (e.g. speed-density systems).

The gas flow sensor or sensors may be positioned as required to properly monitor the gas flow for a specific application. Several examples are shown in FIG. 3 For example, a gas flow sensor 74 could be placed in the outside the housing 28, in the ductwork of the gas flow apparatus 54. This would permit the gas flow sensor 74 to detect a flow rate. Alternatively, one or more gas flow sensors could be placed inside the housing 28, above the build chamber 22. For example, the illustrated gas flow sensor 76 is shown located in a predetermined position known to have the lowest flow rate or flow velocity, for example near the trailing edge 72 and on a right side of the build chamber 22. As another example, an array of gas flow sensors 78 are shown spaced across the upper inlet duct 60, and an array of gas flow sensors 80 are shown spaced across the return duct 64. The provision of either or both arrays would permit positional "mapping" of the gas flow relative to the X-direction.

In operating the machine 10, the required gas flow rate is highly process-dependent. Mainly this is because of the variable heat input of different processes. For example, the powder alloy composition powder layer increment, laser power level, and scan velocity all affect the heat input rate.

Accordingly, controlling the gas flow rate is not as simple as setting a very high gas flow rate for all builds. While this may be physically possible, there are downsides to such a process. Shielding gases can be expensive; therefore it is desirable to use a minimum adequate flow rate. However, the minimum flow rate cannot be determined unless actual flow can be measured. Accordingly, a gas flow monitoring process may be incorporated into the build process described above. Generally stated, the monitoring process includes using the gas flow sensors described above to monitor gas flow and then adjust one or more process parameters as necessary. As used herein, "process parameters" can refer to any controllable aspect of the machine 10 and/or the gas flow apparatus 54.

The monitoring method may include establishing one or more predetermined limits for the gas flow measurements, referred to herein as "gas flow limits", for example: a minimum flow, a maximum flow, or a maximum difference in flow between two or more spaced-apart sensors.

The monitoring method may include taking a discrete action in response to one or more gas flow limits being exceeded, such as providing a visual or audible alarm to a local or remote operator.

The monitoring method may include stopping the build process in response to one or more gas flow limits being exceeded. This is another example of a discrete action The monitoring method may include real-time control of one or more process parameters using method such as: statistical process control, feedforward control, feedback control using proportional, proportional-integral, or proportional-integral-derivative control logic, neural network control algorithms, or fuzzy logic control algorithms.

As an example, a build process could be started using an initial gas flow rate. During the build process, the gas flow sensor would be used to measure a gas flow rate over the build chamber 22. The measured gas flow rate would be compared to a predetermined minimum gas flow rate established based on the specific workpiece and machine parameters (e.g. material, laser power, etc.) If, during the build process, the measured gas flow rate falls lower than the predetermined minimum, the fan speed would be increased to increase the gas flow rate.

The monitoring method may include monitoring of the condition or "health" of the machine 10 and/or the gas flow apparatus 54. Gas flow measurements may be measured and stored during several build cycles and compared between cycles. For example, dropping gas flow rate between cycles could indicate clogging of filter 58, or sudden appearance of variation between gas flow sensors 78 could indicate blockage in one portion of the lower inlet duct 62. Corrective action could take the form of machine maintenance or repairs, or modification of process parameters in subsequent builds to compensate for machine degradation.

The data from the gas flow sensors may be used in conjunction with one or more other process sensors such as photodiodes, pyrometers, acoustic sensors, cameras, or spectrometers. Examples of process aspects that can be measured include but are not limited to melt pool size, melt pool electromagnetic emission, and melt pool acoustic emission. The information from the process sensor may be used as an additional data source for statistical process control or feedback control of the process, as described above. A generic process sensor 82 is shown schematically in FIG. 1.

The operation of the apparatus described above including the machine 10 and gas flow apparatus 54 may be controlled, for example, by software running on one or more processors embodied in one or more devices such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control.

The method described herein has several advantages over the prior art. In particular, it allows provides consistent, adequate gas flow while minimizing the flow of gas. This has the potential to reduce workpiece variation and scrap rate, improve part quality, and monitor the condition of the machine 10.

The foregoing has described an apparatus and method for gas flow monitoring in an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A method of controlling an additive manufacturing process in which a directed energy source is used to selectively fuse powdered material to form a workpiece, in the presence of a gas flow, the method comprising:
using at least one gas flow sensor to generate at least one gas flow measurement, wherein at least one gas flow sensor is measured at a predetermined location of lowest flow over a build surface; and
controlling at least one aspect of the additive manufacturing process in response to the at least one gas flow measurement.

2. The method of claim 1 wherein the at least one gas flow measurement is gas flow rate or gas velocity.

3. The method of claim 1 wherein the step of controlling is in response to the at least one gas flow measurement exceeding one or more predetermined gas flow limits.

4. The method of claim 3 wherein the predetermined gas flow limit includes a maximum difference between two or more spaced-apart gas flow sensors.

5. The method of claim 1 wherein the step of controlling includes changing at least one process parameter of the additive manufacturing process.

6. The method of claim 5 wherein the at least one process parameter includes a gas flow rate.

7. The method of claim 5 wherein the controlled process parameter includes at least one of: directed energy source power level and beam scan velocity.

8. The method of claim 5 wherein the controlled process parameter includes powder layer thickness.

9. The method of claim 1 further comprising using a process sensor to monitor at least one process aspect in addition to the at least one gas flow sensor.

10. The method of claim 9 wherein the process aspect includes at least one of: melt pool size, melt pool electromagnetic emission, and melt pool acoustic emission.

11. A method of making a workpiece, comprising:
depositing a powdered material in a build chamber disposed in a housing, while using a gas flow apparatus coupled in fluid communication with the housing to provide a gas flow over the powder;
in the presence of the gas flow, directing a build beam from a directed energy source to selectively fuse the powdered material in a pattern corresponding to a cross-sectional layer of the workpiece;
using at least one gas flow sensor to generate at least one measurement of the gas flow wherein at least one gas flow sensor is measured at a predetermined location of lowest flow over a build surface; and
controlling at least one aspect of making the workpiece in response to the at least one gas flow measurement.

12. The method of claim 11 further comprising repeating in a cycle the steps of depositing and fusing to build up the workpiece in a layer-by layer fashion.

13. The method of claim 11 wherein the at least one gas flow measurement is gas flow rate or gas velocity.

14. The method of claim 12 wherein the step of controlling is in response to the at least one gas flow measurement exceeding one or more predetermined gas flow limits.

15. The method of claim 14 wherein the predetermined gas flow limit includes a maximum difference between two or more spaced-apart gas flow sensors.

16. The method of claim 11 wherein the step of controlling includes changing at least one process parameter of an additive manufacturing process.

17. The method of claim 16 wherein the at least one process parameter includes a gas flow rate.

18. The method of claim 16 wherein the controlled process parameter includes at least one of: directed energy source power level and beam scan velocity.

19. The method of claim 16 wherein the controlled process parameter includes powder layer thickness.

20. The method of claim 11 further comprising using a process sensor to monitor at least one process aspect in addition to the at least one gas flow sensor.

21. The method of claim 20 wherein the process aspect includes at least one of: melt pool size, melt pool electromagnetic emission, and melt pool acoustic emission.

22. The method of claim 11 wherein:
the gas flow apparatus includes an inlet duct coupled to the housing and positioned adjacent a leading edge of the build chamber;
the gas flow apparatus includes a return duct coupled to the housing and positioned adjacent a trailing edge of the build chamber that is spaced away from the leading edge; and
the gas flow is measured using an array of spaced-apart gas flow sensors disposed adjacent to at least one of the leading edge and the trailing edge.

23. The method of claim 11 wherein:
the gas flow apparatus includes an inlet duct coupled to the housing and positioned adjacent a leading edge of the build chamber;
the gas flow apparatus includes a return duct coupled to the housing and positioned adjacent a trailing edge of the build chamber that is spaced away from the leading edge; and
the gas flow is measured using a gas flow sensor disposed in the gas flow apparatus external to the housing.

* * * * *